United States Patent [19]

Davies

[11] Patent Number: 4,856,734
[45] Date of Patent: Aug. 15, 1989

[54] REACTION JET CONTROL SYSTEM

[75] Inventor: Guy E. Davies, Hampshire, England

[73] Assignee: Plessey Overseas Limited, Essex, England

[21] Appl. No.: 124,797

[22] PCT Filed: Feb. 23, 1987

[86] PCT No.: PCT/GB87/00133
§ 371 Date: Dec. 17, 1987
§ 102(e) Date: Dec. 17, 1987

[87] PCT Pub. No.: WO87/04989
PCT Pub. Date: Aug. 27, 1987

[30] Foreign Application Priority Data

Feb. 21, 1986 [GB] United Kingdom ............... 8604348

[51] Int. Cl.$^4$ ............................................. F42B 15/033
[52] U.S. Cl. ............................................. 244/3.22
[58] Field of Search ............................ 244/3.22, 169;
239/265.25, 265.27, 265.29

[56] References Cited

U.S. PATENT DOCUMENTS

| | | | |
|---|---|---|---|
| 3,278,140 | 10/1966 | Evans | 244/3.22 |
| 3,492,965 | 2/1970 | Mayfield | 115/12 |
| 3,606,165 | 9/1971 | Dunaway | 239/265.17 |
| 3,740,003 | 6/1973 | Ayre et al. | 244/3.22 |
| 3,807,660 | 4/1974 | LeCorviger et al. | 244/3.22 |
| 4,017,040 | 4/1977 | Dillinger et al. | 244/3.22 |
| 4,078,495 | 3/1978 | Ledden, Jr. | 244/3.22 |
| 4,413,795 | 11/1983 | Ryan | 244/3.22 |
| 4,541,592 | 9/1985 | Moll | 244/3.22 |
| 4,712,747 | 12/1987 | Metz et al. | 244/3.22 |

FOREIGN PATENT DOCUMENTS 60726 9/1982 European Pat. Off. .
201316 11/1986 European Pat. Off. .
998417 7/1965 United Kingdom .

*Primary Examiner*—Charles T. Jordan
*Attorney, Agent, or Firm*—Fleit, Jacobson, Cohn, Price, Holman & Stern

[57] ABSTRACT

A reaction jet control system for a flying vehicle, the system comprising pairs (3, 4 and 5, 6) of jet reaction nozzles with associated gas flow supply ducts, the duct between two nozzles (3, 4) of any one pair including a first gas diverter valve (11B) and the duct between the pairs of nozzles including a second gas diverter valve (11A). This arrangement ensures accurate balancing of the gas flows between the nozzles and gives economy in use of the fuel supply.

6 Claims, 3 Drawing Sheets

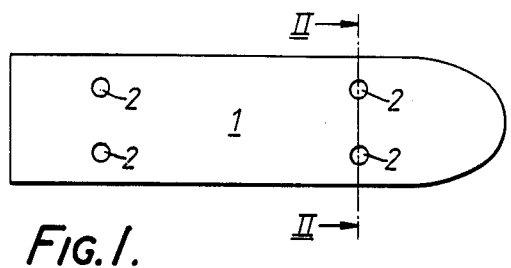
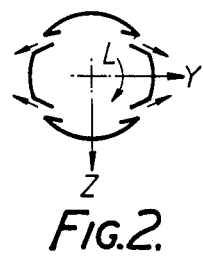
FIG. 1.      FIG. 2.
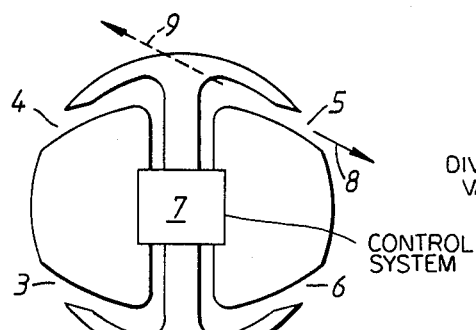
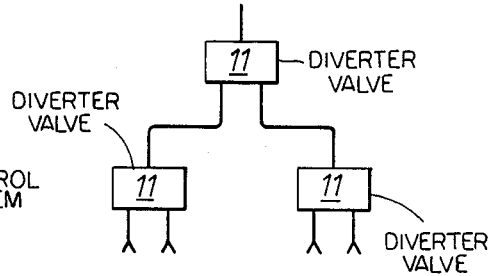
FIG. 3.      FIG. 4.
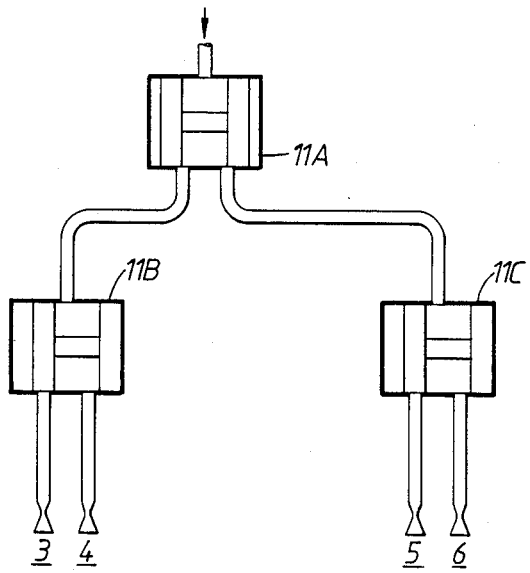
FIG. 5.

REACTION JET CONTROL SYSTEM

This invention relates to a reaction jet control system. It relates particularly to a system for use in a vehicle capable of flight outside the earth's atmosphere where reaction jets are used to control attitude and flight direction.

In providing a jet control system it is necessary for the system to be able to effect the necessary changes in vehicle attitude and flight direction whilst maintaining economy of the fuel gas supply. It is quite likely that the gas for the jet reaction nozzles would be derived from a solid propellant charge which, once ignited, would burn continuously at a steady rate until all the fuel is consumed. Since the gas pressure within a combustion chamber burning a solid propellant charge needs to be maintained within predetermined limits to avoid too slow or too fast burning of the charge, it is not in general possible to modify the gas flow through one nozzle without making a corresponding change to the flow through a different nozzle.

The present invention was devised in order to provide a simple and reliable way of controlling the jet flows which would give economy in the number of mechanical parts needed.

According to the invention, there is provided a reaction jet control system for a flying vehicle, the system comprising pairs of jet reaction nozzles with associated gas flow supply ducts, the duct between two nozzles of any one pair including a first gas diverter valve, and the duct between two pairs of nozzles including a second gas diverter valve.

Preferably, the said first gas diverter valve is a fluidic valve capable of controlling output gas flows without mechanical moving parts. The said fluidic valve may be a momentum interaction amplifier valve. The said fluidic amplifier valve may have two control ports responsive to fluid pressure inputs, the said control ports being connected to a gas pressure balance valve.

Conveniently, the said gas pressure balance valve is a gas flapper valve.

The first diverter valve and the second diverter valve may each be connected to respective gas pressure balance valves.

By way of example, some particular embodiments of the invention will now be described with reference to the accompanying drawings, in which:

FIG. 1 is a side view of a jet vehicle showing one arrangement of jet nozzles,

FIG. 2 is a cross-sectional view taken on the line II—II of FIG. 1,

FIG. 3 is an enlargement of FIG. 2 showing details of the nozzle alignment,

FIG. 4 is a block diagram showing a diverter valve arrangement,

FIG. 5 shows a diverter arrangement using spool valves,

FIG. 1 shows a jet vehicle 1 suitable for flying at extremely high altitude or in space, and which utilises a system of reaction jets from nozzles 2 to control attitude and flight direction. The main thrust nozzles of the vehicle have not been shown.

Figure 6:
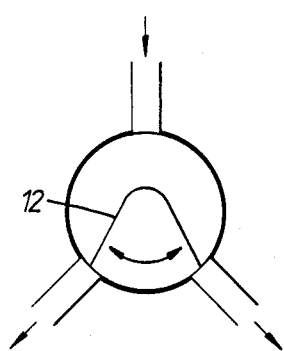
FIG. 6 is a rotary diverter valve.

The cross-sectional view of FIG. 2 shows that two jet nozzles on each side at the front part of the vehicle are capable of controlling Rolling Moment L, Lateral Thrust Y and Vertical Thrust Z. A similar set of four nozzles at the vehicle rear can be used in conjunction with the front nozzles to give additional control of the vehicle attitude.

As shown in FIG. 3, the front nozzles, 3, 4, 5 and 6 can be operated in various arrangements by a control system 7 which has valves to divert a gas supply to different pairs of the nozzles in turn. Thus the jet nozzle 5 can have a jet efflux 8 and this will produce a thrust acting along the line 9 on the vehicle body.

In such a vehicle, it is quite likely that the gas for the jet reaction nozzles will be derived from a solid propellant charge, which once ignited would burn continuously at a steady rate until all the fuel is consumed. In these circumstances it is evident that when any maneuver is demanded, each of the four nozzles in FIG. 3 must be passing half its maximum flow and therefore it will be generating half its maximum thrust. Thus when a maneuver is demanded, two nozzles may have their flow increased, and two may have their flow decreased.

For example, as shown in FIG. 3

| Mode Required | Flow Increase | Flow Reduce |
| --- | --- | --- |
| Roll L | 4, 6 | 3, 5 |
| Lateral Force Y | 3, 4 | 5, 6 |
| Vertical Force Z | 3, 6 | 4, 5 |

A conventional way of operating these nozzles would be to introduce a variable restrictor into the gas supply to each nozzle so that each one may have its flow increased or reduced as necessary. However, this requires each restrictor to be controlled accurately so that a proper balance is achieved between those with the flow increased and those with the flow reduced. If this is not done, a spurious output is obtained, for example, if lateral force was demanded, nozzles 3 and 4 should have their flows increased together. If they do not balance exactly, then a rolling moment and a vertical force will be developed, causing errors in the vehicle attitude.

In addition, the sum of the flows from all the nozzles must remain constant so that the correct combustion chamber pressure is maintained. If too much flow is passed the combustion chamber pressure will drop leading to the possibility of extinction of the combustion flame. If, on the other hand, too little flow is passed the combustion chamber pressure will increase leading to higher combustion rates and ever higher chamber pressure with the eventual possibility of explosive structural failure.

An alternative arrangement making use of diverter valves is depicted in FIG. 4. This shows somewhat schematically, three diverter valves 11 which serve to control four jet nozzles. Each valve is capable of diverting its inlet flow down its two outlets in any proportion from the total amount down one side to the total down the other side and with the total flow remaining constant all the time. In order to assist understanding of the system, the diverter valve may be considered as a spool valve as shown in FIG. 5.

The three diverter valves 11A, 11B and 11C thus control flows to the four jet nozzles 3, 4, 5 and 6.

In order to obtain a rolling moment L from the nozzles it is necessary to increase flow to nozzles 4 and 6, and reduce flow to nozzles 3 and 5. This may be achieved by actuating both valves 11B and 11C to the right so they take up the positions depicted in FIG. 5.

Lateral thrust demand Y is obtained by actuating valve 11A to the left, increasing flow to nozzles 3 and 4, and reducing flow to nozzles 5 and 6.

Vertical thrust demand Z is obtained by actuating valves 11B and 11C in opposite directions, increasing flow to nozzles 3 and 6, and reducing flow to nozzles 4 and 5.

Figure 7:
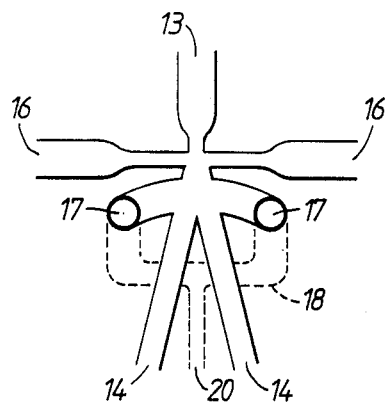
FIG. 7 is a fluidic diverter valve.

It will be appreciated that the use of diverter valves ensures constant flow at all times through the system thus keeping the combustion chamber pressure steady. It is relatively simple to maintain a balance between the nozzles having a maximum flow and those having a minimum flow because any out of balance can be removed by an adjustment in the actuation of single valve (11B or 11C). It will also be appreciated that the invention is not restricted to the use of any particular type of diverter valve. Provided the valve is capable of passing a constant flow of gas an alternative type of valve might be used. FIGS. 6 and 7 show respectively a rotary type of diverter valve having a movable control member 12, and a fluidic valve.

In general, the gas stream produced from the combustion chamber will be extremely hot, with a temperature of the order of 2000° C. and the stream may also contain particulate matter with the combustion products. It may not be practical therefore to use mechanical moving part valves under these conditions. One solution to this problem is to use the fluidic diverter valve shown in FIG. 7.

The fluidic diverter valve is based on the well established fluidic momentum interaction amplifier in which the gas stream at an inlet port 13 can be deflected in any proportion between the two outlet ports 14 by a low level gas pressure stream applied to either of the control ports 16. A vent 17 is provided to prevent wall attachment of the fluid stream by the Coanda effect which would lead to digital operation of the valve. The vents at the two sides of the valve are joined by a vent connecting passage 18. In conventional use, the vent would discharge to atmosphere, but in this application all gas must be exhausted through the thrust-nozzles, since all exhaust gas will generate thrust and none must be lost by discharge in a non-useful direction. In order to achieve this object, the vent connecting passage 18 is provided with a further inlet opening 20 which is intended to receive the gas output from a vent of a flapper valve arrangement (about to be described).

Figure 8:
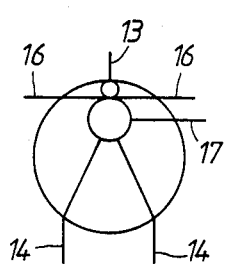
FIG. 8 shows a schematic diagram symbol for a fluidic diverter valve.

A schematic diagram of the fluidic diverter valve is given in FIG. 8.

Figure 9:
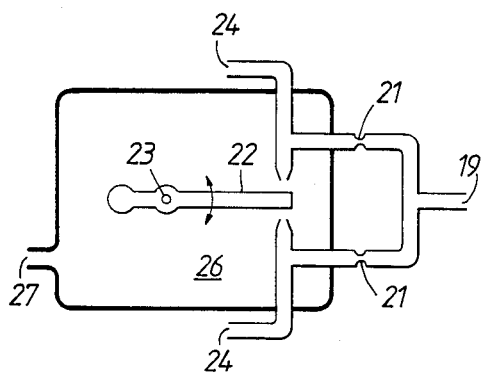
FIG. 9 is a flapper valve.

The control pressure signals may be generated by a simple flapper valve arrangement as shown in FIG. 9. In this Figure, the valve has an inlet port 19 and two flow restrictors 21 for the incoming gas streams. The incoming gas streams are arranged to impinge equally on a flapper 22 mounted on a pivot 23. This provides control pressure outputs at output ports 24 and these control pressures may be applied to the control ports 16 of a fluidic diverter valve. A vent enclosure 26 surrounds the flapper 22 and has a vent outlet port 27 an output from which may be applied to the vent 17 of the fluidic valve.

In order to control the control gas pressures appearing at the output ports 24, the flapper 24 is moved up or down mechanically by a suitable actuator in response to signals from the control system of the vehicle.

Figure 10:
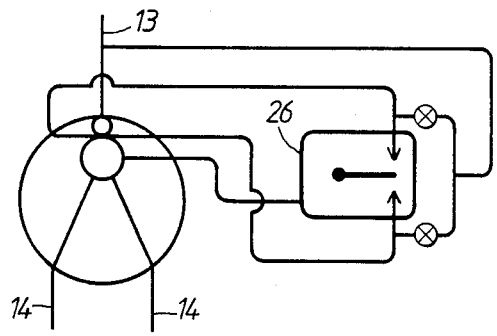
FIG. 10 is a schematic diagram of a fluidic diverter and flapper valve circuit, and, FIG. 11 is a schematic control system for four nozzles.

A schematic diagram of a flapper valve arrangement connected to control a fluidic diverter valve is given in FIG. 10.

Figure 11:
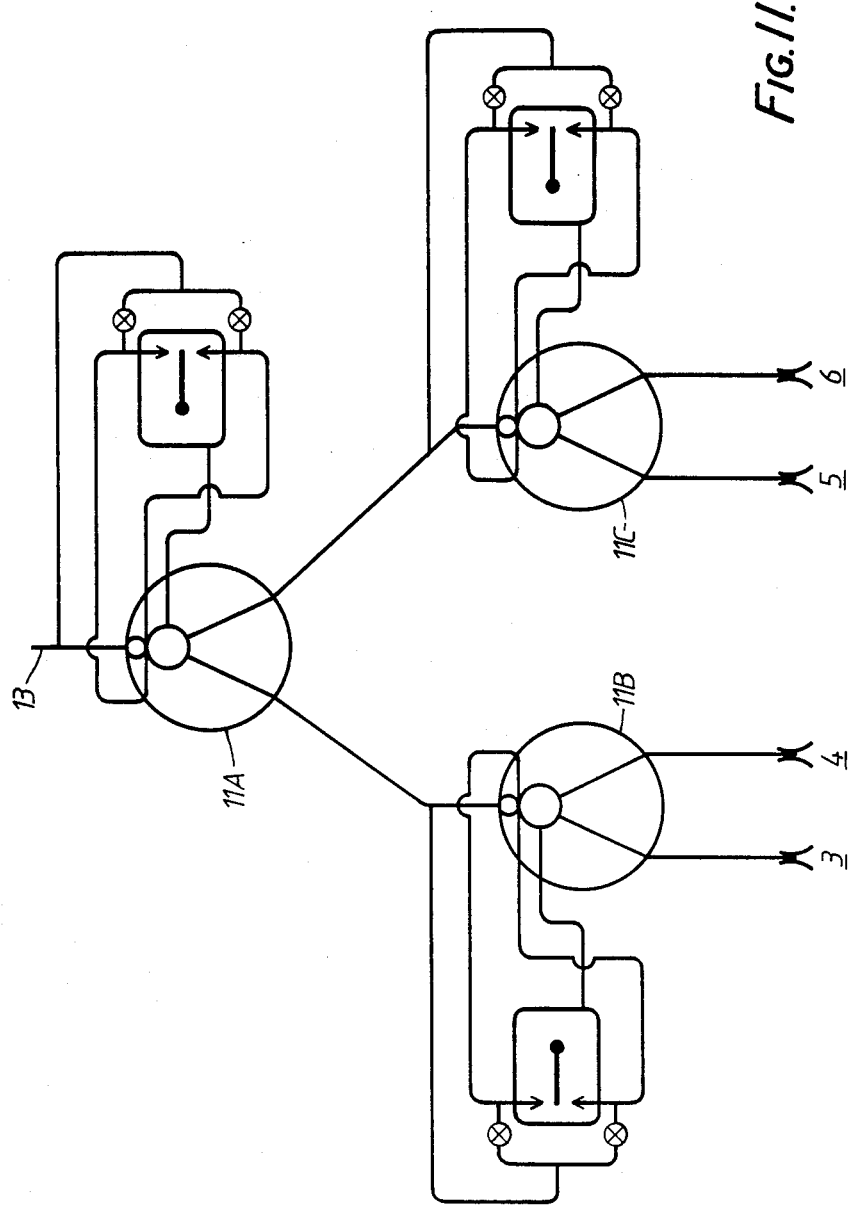

A complete system diagram for controlling four nozzles is shown schematically in FIG. 11. This would thus be suitable for controlling the gas streams emerging from the four jet nozzles 3, 4, 5, 6 by actuating the three diverter valves 11A, 11B, and 11C. This would thus be suitable for the four nozzles located at the front end of the jet vehicle and a similar control system would be used for the four nozzles at the rear end of the craft.

It will be noted that an advantage of the system shown in FIG. 11 is that only three actuators are required to control the four nozzles compared with the conventional approach where four actuators would be required, one for each nozzle restrictor. The arrangement of the invention therefore not only simplifies the gas handling system making it lighter and cheaper, it also simplifies the control system.

The foregoing description of an embodiment of the invention has been given by way of example only and a number of modifications may be made without departing from the scope of the invention as defined in the appended claims. For instance, it is not essential that the control system should be applied to a vehicle having a combustion chamber relying on a solid fuel propellant material, in a different embodiment, the invention might be applied to gas streams derived from a liquid fuel propellant material.

I claim:

1. A reaction jet control system for a flying vehicle, the system comprising pairs of jet reaction nozzles with associated gas flow supply ducts, the duct between two nozzles of any one pair including a first gas diverter valve and the duct between two pairs of nozzles including a second gas diverter valve.

2. A control system as claimed in claim 1, in which the said first gas diverter valve is a fluidic valve capable of controlling output gas flows without mechanical moving parts.

3. A control system as claimed in claim 2, in which the said fluidic valve is a momentum interaction amplifier valve.

4. A control system as claimed in claim 3, in which the said fluidic amplifier valve has two control ports responsive to fluid pressure inputs the said control ports being connected to a gas pressure balance valve.

5. A control system as claimed in claim 4, in which the said gas pressure balance valve is a gas flapper valve.

6. A control system as claimed in claim 3 or claim 4 in which the said first diverter valve and the said second diverter valve are each connected to respective gas pressure balance valves.

* * * * *